UNITED STATES PATENT OFFICE.

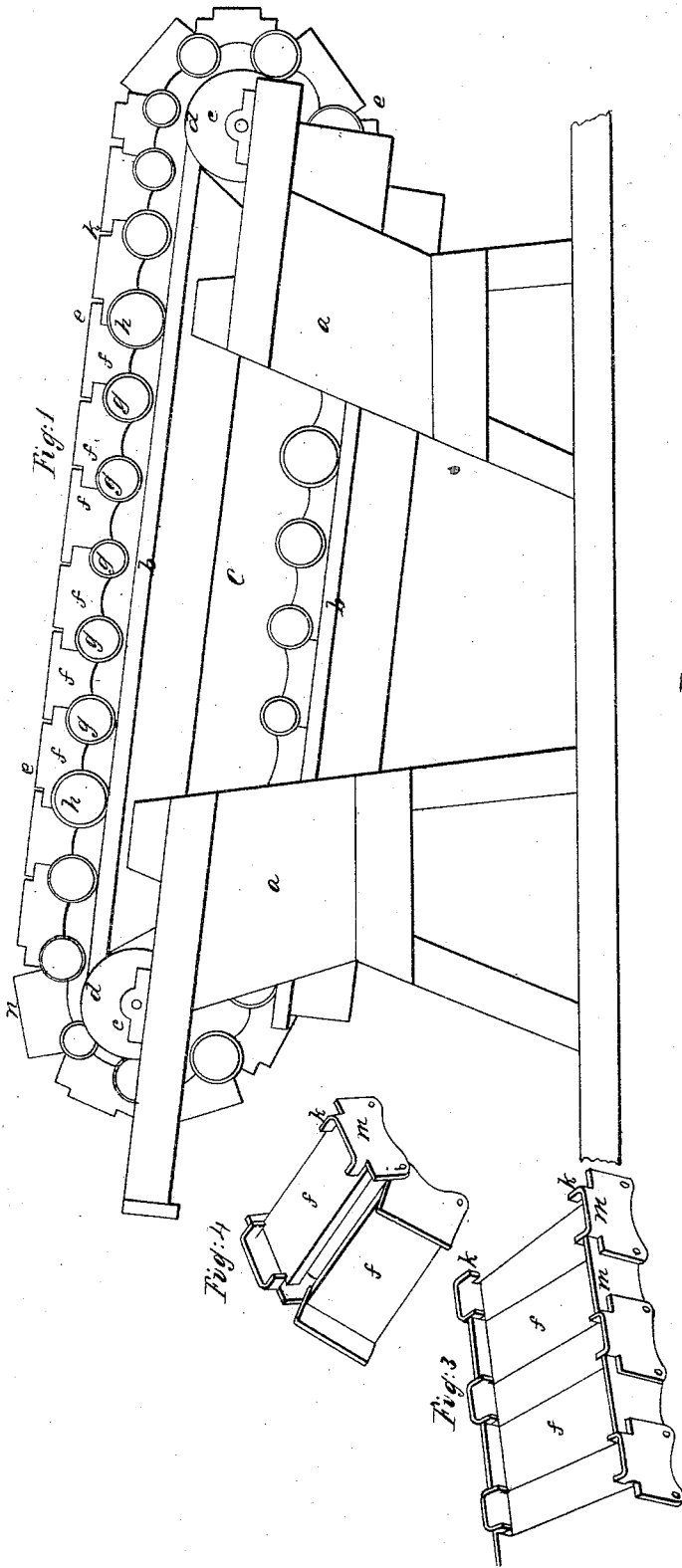

SAML. FALWELL, OF MEMPHIS, TENNESSEE.

ENDLESS CONVEYER FOR REMOVING EARTH.

Specification of Letters Patent No. 22,552, dated January 11, 1859.

*To all whom it may concern:*

Be it known that I, SAMUEL FALWELL, of Memphis, in the county of Shelby and State of Tennessee, have invented an Improvement in Endless Conveyers, and that the following is a full, clear, and exact description of the principle or character which distinguishes it from all other things before known and of the usual manner of making, modifying, and using the same, reference being had to the accompanying drawings, of which—

Figure 1 is a side elevation; Fig. 2, is a plan of the machine; Fig. 3, a detached view of sections of a car; Fig. 4, an enlarged view of the sections.

My invention consists in an improvement in endless conveyers for the purpose of removing earth in excavating for railroads and other purposes.

Upon suitable structures of timber ($a$) ($a$) are laid upper and lower railway tracks ($b$) ($b'$) with such inclination as the case may require. Between the ends of these tracks are large friction wheels ($c$) ($c$) which have the highest points of their circumference ($d$) ($d$) on a level with the extremities of the rails ($b$).

The endless conveyer G consists of a series of cars ($e$) ($e$) which are each composed of sections ($f$) ($f$) hinged together or pivoted upon the axes of the small wheels ($g$) ($g$). These sections are sufficiently narrow to turn readily upon the end rollers or wheels ($c$). The wheels ($g$) are of less diameter than the supporting or track wheels ($h$) ($h$) so that they do not touch the tracks until they are near their ends and the sections spread open over the end wheels ($c$). The object of keeping them from the track is to save friction and wear. The small wheels diminish in diameter toward the center of the car for the reason that the center will be apt to swag when the car is loaded. To prevent the swagging of the sections of the cars each section is furnished with checks or shoulder stops ($k$) ($k$) against which the side panels ($m$) ($m$) of the cars abut, and thus make a firm support. As the cars are loaded at the highest point ($n$) the weight of the load will carry the car down, moving the whole chain and the material will be delivered at the lowest point.

The endless chain may be of any desired length and the piers or supports for the tracks may be distant from each other twenty feet or upward, or as may be found best.

I do not claim an endless chain or series of buckets or boxes for carrying or conveying purposes, but

What I claim as my improvement is—

1. The series of sectional cars ($e$) ($e$) in an endless connection each car being provided with terminal or track wheels ($h$) and intermediate wheels ($g$) ($g$) of varying and lesser diameter than the track wheels, and shoulder stops ($k$) ($k$) or equivalent thereof substantially as herein above set forth.

2. I claim the combination of such cars with an upper and lower track and wheels ($c$) ($c$) as set forth.

S. FALWELL.

Witnesses:
CHAS. G. PAGE,
WM. H. HARRISON.